March 11, 1952 M. L. HECHT 2,588,924
ELECTRONIC TRIGGER CIRCUIT
Filed May 26, 1950
FIG. 1
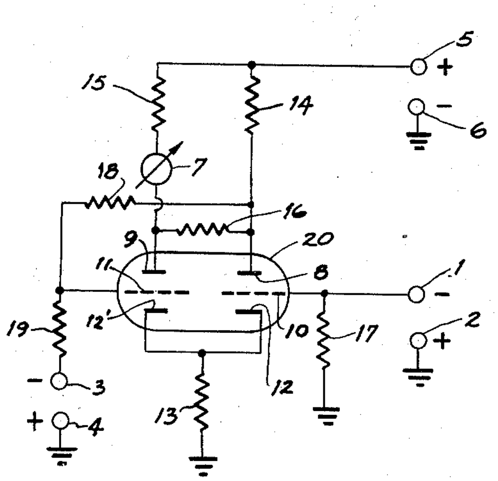
FIG. 2
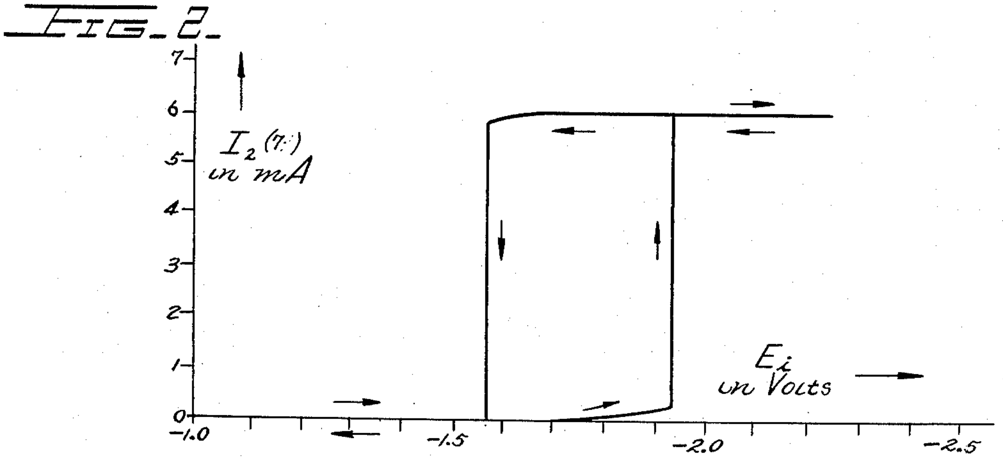
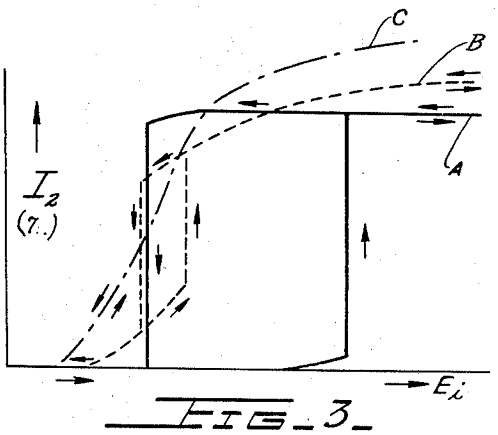
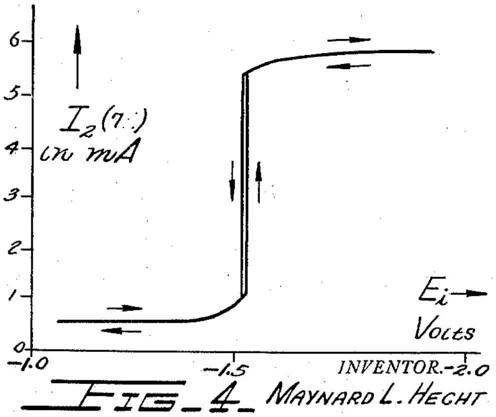
FIG. 3 FIG. 4
INVENTOR.
MAYNARD L. HECHT
BY Clyde A. Norton
ATTORNEY Patented Mar. 11, 1952

2,588,924

UNITED STATES PATENT OFFICE 2,588,924

ELECTRONIC TRIGGER CIRCUIT

Maynard L. Hecht, Jackson Heights, N. Y.

Application May 26, 1950, Serial No. 164,449

5 Claims. (Cl. 250—27)

This invention relates to electronic trigger circuits, and more particularly to an improved electronic trigger circuit operated by simultaneously changing input grid and plate potentials of the triggered tube, using positive feedback to initiate the trigger action and simultaneous negative feedback to shift said action to a useful operating point of the trigger tube.

It is an object of this invention to provide an improved and novel electronic trigger circuit.

It is another object of this invention to provide an improved electronic circuit with greater sensitivity and efficiency.

It is another object of this invention to provide an improved trigger circuit which appreciably reduces back-lash voltage, assuming current jumps of equal magnitude.

It is another object of this invention to provide an improved trigger circuit capable of larger and steeper variations in current at the triggering point, assuming equal backlash voltages.

It is another object of this invention to provide an electronic trigger circuit which is specifically an improvement over the so-called Schmitt trigger circuit in that it is more sensitive to small voltage differences and involves smaller operating and building costs than the Schmitt circuit, when the latter is combined with the additional apparatus necessary to achieve equivalent performance. For example, the improved circuit eliminates the necessity of at least one or two stages of D. C. amplification of the control signal in many cases.

The features of novelty which I believe to be characteristic of my invention are set forth with particularity in the appended claims. My invention itself, however, both as to its fundamental principles, and as to its particular embodiments, will best be understood by reference to the specification and accompanying drawing, in which:

Figure 1 is a schematic circuit diagram of the trigger circuit.

Figure 2 is a graph in which the measured output current is plotted against input voltage for the so-called Schmitt trigger circuit, which latter was the circuit of Figure 1 minus resistor 13.

Figure 3 is a graph showing changes that occur, under certain conditions, to curves of the type shown in Figure 2.

Figure 4 is a graph in which output current is plotted against input voltage for the instant invention.

This invention is an improvement on the Schmitt circuit (see O. H. Schmitt, "A Thermionic Trigger," Journ. Sci. Insts. 1938 XV pp. 24–26) in that I have introduced a resistor 16 connected between plates 8 and 9 of the first and second amplifier stages respectively. This greatly improves the operation of the circuit in ways which will be described.

The Schmitt trigger circuit is essentially a two-stage D. C. amplifier employing positive current feedback by means of a common cathode resistor. For example, the input voltage, which is to be the control, is applied at 1, 2 to the grid 10 of the first stage tube having the cathode 12 and anode 8. The output of the first stage is fed through resistor 18 to the grid 11 of the second stage which stage also includes the cathode 13 and anode 9. A negative potential for grid 11 is applied at 3, 4. The two tubes or stages have a common source of plate potential 5, 6 controlled by resistors 14 and 15 and a common cathode resistor 13. Without resistor 16, or in the case of the Schmitt circuit, there is a so-called back-lash voltage to be contended with, that is, the difference between the critical values of the first stage grid input voltage where the output current on the second stage plate jumps up, and where it jumps down. In other words, the plate current in the second stage jumps downward at a different value of input voltage at the grid in stage one than that at which it previously jumped up.

For control purposes where the first stage grid input voltage is partially derived from the control signal, it is desirable that the back-lash voltage be as small as possible. If the back-lash voltage should be of the order of magnitude of the control signal itself, then it would badly affect the precision of the control. This unwanted effect could be decreased by sufficiently amplifying the control voltage before applying it to switch the trigger circuit. If the back-lash voltage should be only ¼ volt and it is desired to introduce an uncertainty no larger than 1% of the control voltage, then the control signal would have to be at least 25 volts. If the control voltage has to be around 1.5 volts, then it would be necessary to use an additional bias source in series with the signal to reduce 25 volts to the negative value of 1.5 volts. On the other hand, if the back-lash voltage can be made small enough, the additional amplifier can be dispensed with along with the additional bias source and errors due to drift, etc. caused by the additional instrumentation are eliminated.

Although the back-lash voltage may be minimized by decreasing resistance 13, which is common to cathodes 12 and 12′, this method is severely limited because the abrupt jump in output current, shown by graph A, Figure 3 will turn into a steady slope as in curve C, Figure 3 for too small values of resistance 13. But even before this point is reached, the difference between the two levels of output current becomes smaller and smaller, meaning that the lower level moves up and the upper level moves down, as shown by curve B, Figure 3. In fact, the resistance 13 is often made variable in the ordinary Schmitt circuit.

The above introduction demonstrates the desirability of a further development of the feedback D. C. amplifier trigger circuit, having as an important objective its inherent reliable trigger action coupled with a much smaller backlash voltage than has been achieved heretofore.

The objects of this invention have been accomplished by the insertion of resistor 16 between the plates 8 and 9 of the first and second stages.

Now assuming that at the start of a cycle the plate current in the second stage is zero, whereas that of the first stage has a nominal value, then if the input voltage across 1 and 2 is then made more negative, the current to the plate 8 of the first stage will decrease while the current to plate 9 of the second stage will rise above zero, provided, of course, that the negative bias for the grid 11 of the second stage has the proper value.

When the current on plate 8 in stage one decreases, then the resulting rise of the plate potential of stage one will tend to increase the plate current of stage two at 9, by increasing the plate voltage on plate 9 through resistors 14 and 16. Whereas before the decrease of plate current at 8 in stage one, plate current flowed to plate 8, through a first path through resistance 14, and through a second path including resistors 15 and 16 in parallel with the first path, the total current through resistors 15 and 16 decreases with a decrease of the first stage plate current and finally, the current in resistor 16 reverses its direction so as to flow to plate 9 of the second stage instead of to plate 8 of the first, as soon as the input voltage across terminals 1 and 2 has reached a sufficiently high negative value. After this reversal has occurred, a current through resistors 14 and 16 will add to the current in plate 9 of the second stage through resistance 15, and thus increase, by a greater increment, the negative potential on grid 10 of the first stage than would be produced by the current through resistance 15 alone. Consequently, additional positive feedback will begin as soon as said reversal occurs. Since in this circuit the grid and plate potential of the second stage thus become simultaneously more positive as a result of the input voltage across 1 and 2, the plate current in the second stage will jump to its full value for a smaller change in the negative direction of the negative value of input voltage than if resistor 16 were omitted.

Because resistor 16 is connected between the plates of successive stages of an amplifier, it also causes negative voltage feedback. Therefore, resistor 16 must not be chosen too low, for then the negative feedback would compensate too much of the positive feedback and the current would merely vary continuously with the changing input voltages instead of performing the desired jump or trigger action at a desired value of input voltage.

For the same net amount of over-all positive feedback, the cathode resistor 13 can be given a higher value, because the negative voltage feedback caused by resistor 16 compensates part of the positive feedback due to resistor 13; and, because positive feedback does not drive the state of equilibrium so far in one direction as it does without 16, the current jumps for the same amount of total positive feedback and equal backlash voltages will be larger with resistor 16 than without it for equally high values of 13. It will be remembered that the larger resistor 13 is, the greater will be the change in grid potentials for equal current jumps. Resistor 16 helps the grids to reach the correct triggering potential for a smaller back-lash voltage. This circuit, therefore, produces a greater difference between the current levels of the two different states for the same backlash voltages than would be produced without resistor 16, and conversely, for the same values of plate current in the two states, the backlash voltage is considerably smaller.

Figure 4 shows graphically the measured behavior of the circuit shown in Figure 1. Although the values of all circuit parameters are made the same as in the corresponding Schmitt circuit, except for the inclusion of resistor 16 in the instant circuit, the magnitude of the back-lash voltage is radically smaller than that shown in Figure 2 for the Schmitt circuit.

For example, if:

Resistor 14=30,000 ohms
Resistor 15=10,000 ohms
Resistor 17=500,000 ohms
Resistor 19=474,000 ohms
Resistor 18=510,000 ohms
Resistor 13=160 ohms
Voltage across terminals 5 and 6=290 volts
Voltage across terminals 3 and 4=222 volts
Resistor 16=115,000 ohms 7 is a conventional milliammeter, and tube 20 is type 6SL7, then the back-lash voltage for the Schmitt circuit is about .35 volt as shown in Figure 2, whereas the back-lash voltage as measured after the introduction of resistor 16, as shown in Figure 4, is less than .02 volt. This means that the action of resistor 16 reduced the back-lash voltage by more than 20 times.

This improved trigger circuit makes it possible to connect the circuit directly to many control signal sources which previously required the employment of at least one or two stages of D. C. amplification, thus eliminating such stages and with them all additional attendant complications which, in addition to the bias source mentioned above, increased the cost by requiring a greater power supply.

In the specification, I have explained the principles of my invention and the best mode in which I have contemplated applying those principles, so as to distinguish my invention from other inventions; and I have particularly pointed out and distinctly claimed the part, improvement or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. In an electronic trigger circuit consisting of a two-stage direct current amplifier, each stage having an electron tube with a cathode, an anode, and a control electrode, a resistance coupling between the anode of the first stage and the control electrode of the second stage, a cathode resistance common to said stages, and a resistance connected between said anodes, the value of said last-mentioned resistance being so chosen as to substantially reduce the back-lash voltage which would occur in the absence of said last mentioned resistor.

2. In an electronic trigger circuit consisting of a two-stage direct current amplifier with positive feedback, each stage having an electron tube with a cathode, an anode, and a control electrode, a resistance coupling between the anode of the first stage and the control electrode of the second stage, a cathode resistance common to said stages, and a resistance connected between said anodes, the value of said last-mentioned resistance being such that for equal trigger action plate current jumps, the back-lash voltage occurring is materially less than that occurring in the absence of said last mentioned resistor.

3. In an electronic trigger circuit consisting of a two-stage direct current amplifier with positive feedback, each stage having an electron tube with a cathode, an anode, and a control electrode, a resistance coupling between the anode of the first stage and the control electrode of the second stage, a cathode resistance common to said stages, and a resistance connected between said anodes, the value of said resistance being such that the trigger action produces larger and steeper current jumps than would occur in the absence of said last resistance, when adjusted for equal back-lash voltages in either case.

4. In an electronic trigger circuit consisting of a two-stage direct current amplifier, each stage having an electron tube with a cathode, an anode and a control electrode, a resistance coupling between the output of the first stage and the input of the second stage, a cathode resistance common to said stages introducing positive feedback from the second to the first stage, and a resistance connected between said anodes introducing negative feedback from the second to the first stage, the values of said common cathode resistance and the resistance connected between said anodes being so chosen as to give a resultant positive feedback and a substantially reduced back-lash voltage as compared to that obtainable in the absence of said last mentioned resistor.

5. In an electronic trigger circuit consisting of a two-stage direct current amplifier, each stage having an electron tube with a cathode, an anode, and a control electrode, a resistance coupling between the output of the first stage and the input of the second stage, a cathode resistance common to said stages introducing positive feedback from the second to the first stage, and a resistance connected between said anodes providing a simultaneous increase of the plate voltage of the second stage when the control grid of the said stage becomes more positive, and a simultaneous decrease of the plate voltage of the said stage when the control grid of said stage becomes more negative as a function of the input signal to the first stage, thus considerably assisting the trigger action when the circuit approaches the triggering point and thereby contributing to greatly decreasing the backlash voltage.

MAYNARD L. HECHT.

REFERENCES CITED

The following references are of record in the file of this patent:

UNITED STATES PATENTS

| Number | Name | Date |
|---|---|---|
| 2,455,616 | Shepard | Dec. 7, 1948 |

FOREIGN PATENTS

| Number | Country | Date |
|---|---|---|
| 412,182 | Great Britain | June 1934 |

OTHER REFERENCES

Article, Schmitt's Trigger Circuit, from pages 57–59 of "Time Bases" by Puckle, Dec. 19, 1947.